Oct. 4, 1949.  H. P. SMITH  2,483,507
FISH GRADING AND SEPARATING APPARATUS
Filed Nov. 10, 1945
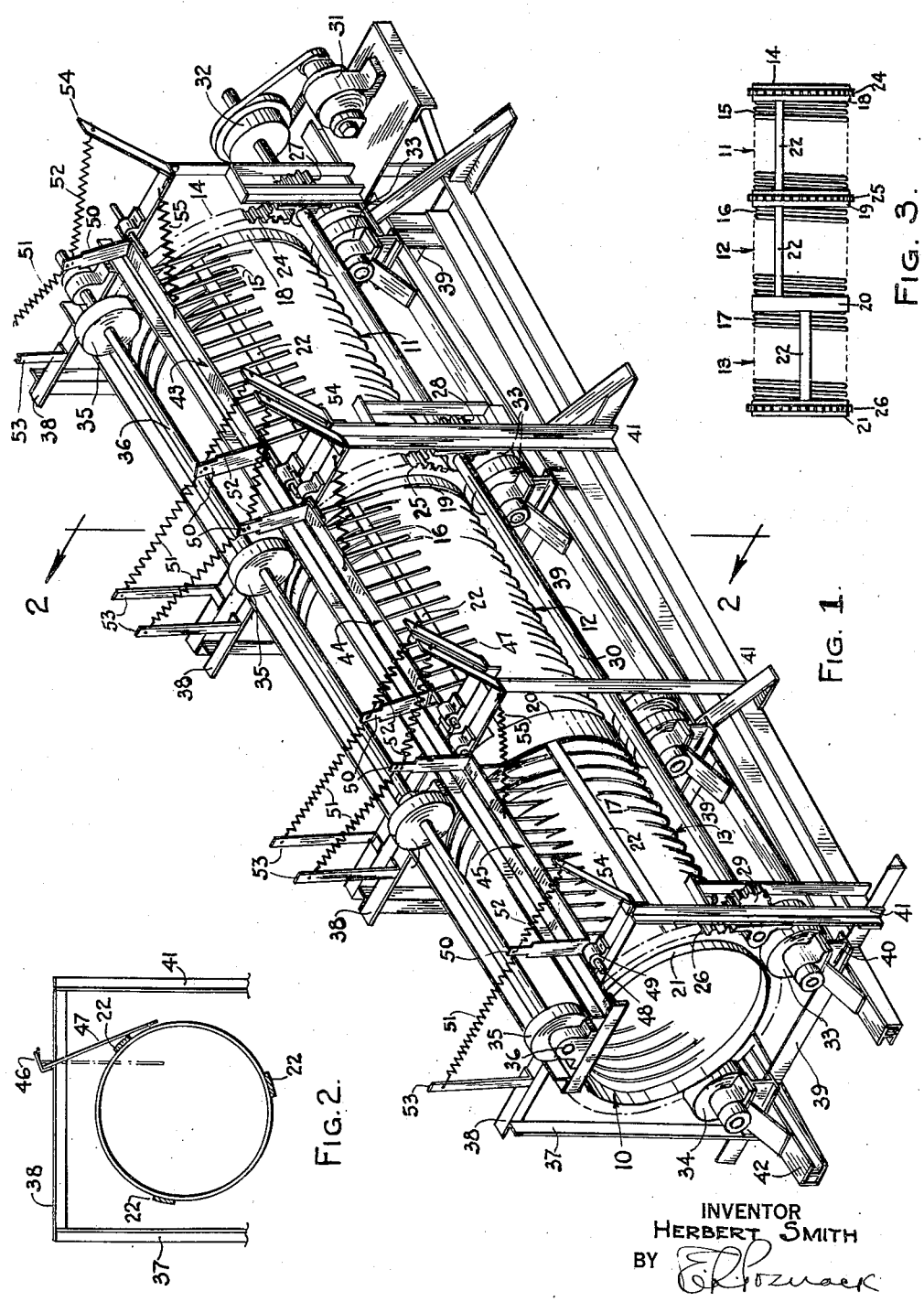
INVENTOR
HERBERT SMITH
BY
ATTORNEY Patented Oct. 4, 1949

2,483,507

UNITED STATES PATENT OFFICE 2,483,507

FISH GRADING AND SEPARATING APPARATUS

Herbert P. Smith, Eastport, Maine, assignor to Riviera Packing Company, Eastport, Maine, a partnership composed of Victor N. Cory and Arnold Vogl Application November 10, 1945, Serial No. 627,920

4 Claims. (Cl. 209—384)

This invention relates to grading and sorting apparatus, and particularly although not exclusively to fish separators for grading a cargo of mixed size fish, and distributing and discharging the fish according to size.

Although various mechanical methods of grading fish have heretofore been employed, certain difficulties have been encountered which served to interfere with the smooth functioning of such processes. Outstanding among these difficulties was that caused by the tendency of the fish to clog discharge openings, a condition that was due to the limpness of the fish, and their lack of uniformity in size and shape, even of graded fish. Because of their softness and pliability, small portions of large fish tend to enter small discharge openings in most known mechanical separators, and fish that might normally pass through openings of their size become distorted or twisted during the process, and accordingly block or clog said openings.

It is within the contemplation of this invention to provide an apparatus of the said category wherein this shortcoming is eliminated. And, according to the preferred form of practicing my invention, this objective is accomplished by providing movable dislodging means to remove fish caught in the discharge openings.

It is another object of this invention to provide a simple and effective method of continuously grading a mixed cargo of fish, whereby fish can be separated and discharged in progressively increasing sizes.

Other objects, features and advantages will appear from the drawings and the description hereinafter given.

Figure 1 is a perspective view, showing the structure of my invention;

Figure 2 is a section of a fragment of Figure 1 taken substantially along line 2—2; and Figure 3 is a side elevation, in reduced size, of the cylindrical cage portion of this invention.

Referring to the particular embodiment of my invention illustrated, the apparatus comprises a rotatably mounted inclined cylindrical cage with helical circumferentially disposed spaces of predetermined proportions, the spaces serving as discharge openings for fish disposed within the cage. To dislodge fish caught between the spaces in the wall of the cage, a plurality of movably mounted tines extend into the spaces, whereby they will engage any fish lodged therein and remove them from their obstructing positions.

More specifically, the apparatus contains the rotatably mounted cage 10 comprising, in the preferred embodiment illustrated, an arrangement of coiled pipe in helical formation in three continuous sections 11, 12 and 13. The cage 10 is positioned at a slight incline, a satisfactory inclination having been found to be 9° from the horizontal, the loading end 14 of the cage being the elevated end. The spaces between adjacent coils serve as discharge outlets, as will more clearly hereinafter appear, the spaces 15 in section 11 being narrowest, and the spaces 16 and 17 in sections 12 and 13, respectively, being progressively wider.

The cage sections 11, 12 and 13 are secured to the inside of collars 18, 19, 20 and 21, and said sections are further reinforced by the equally spaced bars or ribs 22, which extend longitudinally of the cage and are attached to the coils, preferably by welding, 120° apart. These ribs serve an additional function in connection with the dislodging of obstructing fish, as will more clearly hereinafter appear.

Associated with collars 18, 19 and 21 are gears 24, 25 and 26, respectively, which are engaged by spur gears 27, 28 and 29 fixedly mounted upon the longitudinally extending drive shaft 30. At the forward or drive end of the apparatus is the motor 31 which is operatively connected, through the reduction unit 32, with the said drive shaft 30.

The cage 10 is rotatably supported by a plurality of rollers 33 and 34 in underlying supporting engagement with the said collars 18, 19, 20 and 21, rollers 33 and 34 being on opposite sides of the cage's longitudinal axis. An upper series of guide rollers 35 are in resting engagement with said collars along the upper center-line of the cage, these rollers being fixedly mounted on longitudinally extending shaft 36, and serving the purpose of keeping the entire assembly running smoothly. The roller shafts are suitably supported by bearings in a manner well known in the art, the entire assembly being supported by a structural frame 37. This frame, in the particular embodiment illustrated, includes among others, the transverse top members 38, the transverse bottom members 39, the bearing supports 40, the vertical members 41, and the inclined I-beams 42 supporting the members 40.

Operatively supported by transverse members 38 at the upper part of the apparatus are the three rakes 43, 44 and 45 associated with cage sections 11, 12 and 13, respectively. Each of these rakes consists of a supporting member or base 46, illustrated as of angle-iron construction, to which are attached a plurality of fingers or tines 47 extending generally downwardly into the helical cage spaces therebelow. The ends of base 46 are provided with shafts 48 rotatably mounted within bearings 49 supported by transverse members 38. At each end of the base 46 is a lever 50 to which are attached oppositely disposed springs 51 and 52, the former being anchored to post 53 and the latter to post 54, the springs being of such length and tension as normally to maintain the tines 47 in a direction which places them within said spaces 15, 16 and 17, the preferred normal disposition of the tines being vertical. To each base, preferably at a point intermediate the ends thereof, is also attached a generally longitudinally disposed return spring 55, anchored to some suitable stationary part of the structure, such as the transverse member 38. The purpose of springs 55 is to return the rakes to their original positions when they are released from their operatively displaced positions, as will more fully hereinafter appear.

In the operation of this apparatus, a batch of fish of mixed sizes is fed into the raised forward end 14 of the operatively rotating cage. Due to the downward inclination of the cage and aided by the conveyor action of the helical coil, the fish is progressively moved along the interior of the cage. The smaller fish will drop through the spaces 15 at the lower region of section 11, the spaces being too small for the larger fish. By the same process progressively larger fish drop through the spaces 16 and 17 in sections 12 and 13.

It is obviously important that the spaces be clear, for not only are lodged fish themselves prevented from being discharged, but they also obstuct the outlet passageways for other fish. The rakes above described prevent this condition by engaging fish caught between the spaces, and dislodging them, an action which will now be described.

When a lodged fish is carried up by the revolving cage to the top of the apparatus in the region of the rake, it is engaged by one or more tines, and because of the relative movement of the cage and tines, the engagement is effective in moving the fish from its lodged position, or completely dislodging it. As mentioned above, the ribs 22 serve to actuate the tines 47 and their base member 46 in dislodging fish caught in the discharge of openings, as will now be described. As the cage continues to rotate, a rib 22 will engage the tines 47, and rotatably actuate the entire rake about its rotatable mounting; and as this motion continues the tines are ultimately moved clear out of the spaces to slidably move along the upper surface of the engaging rib. Thus, in section 13 of the cage the rib 22 has moved past the tines, and is out of engagement therewith. But in sections 11 and 12 the tines are shown resting upon the ribs 22, the tines having been completely moved out of the spaces between the coils. As the cage continues its rotation, the rake will be yieldably brought back into its normal position by said springs 51 and 52, and the tines will again be disposed within the spaces. And this operation repeats itself as many times per revolution of the cage as there are ribs 22 around each section, in the apparatus illustrated three times per revolution.

The outward movement of the tines has the effect of positively clearing the spaces through which they move, and inasmuch as in the preferred form of this invention there is a tine for every space, it is apparent that all spaces are kept clear by this action.

It will be noted that as the cage rotates, each rake moves longitudinally parallel to the cage's axis, due to the helical spaces between the coils. When the tines are in their clear position, as illustrated in sections 11 and 12 of the cage, they are released from their engagement with the coils; and hence the springs 55 urge the rakes back to their original positions.

Receptacles for receiving the discharged fish are not shown, inasmuch as their use underneath the cage is self-apparent. Neither are spray nozzles shown for directing jets of water into the cage, as they do not constitute a part of this invention, and for the further reason that their action is well known and understood in the act.

It is understood that the embodiment above described and shown in the drawings is merely illustrative of my invention, and that numerous changes and modifications may be made therein within the scope of the appended claims without departing from spirit of this invention.

I claim:

1. A dislodging mechanism for a fish separating apparatus of the type having a rotatable cylindrical cage formed of a helically coiled element presenting discharge openings between the convolutions thereof, said mechanism comprising a supporting member having fixedly attached thereto a plurality of elongated tine fingers spaced to correspond to the pitch of said convolutions and pivotally mounted for turning between a position disposing its fingers through the discharge openings into the interior of the cage and a position withdrawing the fingers therefrom, spring means urging the supporting member to its first said position, a plurality of bars longitudinally secured exteriorly of the cage at spaced points thereabouts and adapted to contact and turn the said fingers outwardly to the second said position, said outward turning of the fingers tensioning the said springs means whereby, when the said cage bar leaves the distal end of the fingers, the said tensioned spring returns them to the first said position with sufficient impact to dislodge any fish caught in the said discharge openings, said fingers being of a thickness less than said discharge openings and their said supporting member being axially movable for a limited extent and having a spring urging it to one end thereof, the said helically coiled element advancing the fingers and their supporting member axially against its said spring whereby, when the fingers are turned by the bar to their second said position, the supporting member is returned axially by its said spring to its said end position for entering the said convoluted discharge openings at another angular position of the cage.

2. A dislodging mechanism for a fish separating apparatus of the type having a rotatable cylindrical cage formed of a helically coiled element presenting discharge openings between the convolutions thereof, said mechanism comprising a supporting member having fixedly attached thereto a plurality of elongated fingers spaced to correspond to the pitch of said convolutions and pivotly mounted for turning between a position disposing its said fingers through the said discharge openings into the interior of the cage and a position withdrawing the fingers therefrom, spring means urging the supporting member to its first said position, at least one bar longitudinally secured exteriorly of the cage at spaced points thereabouts and adapted to contact and turn the said fingers outwardly to the second said position, said outward turning of the fingers tensioning the said springs means whereby, when the said cage bar leaves the distal end of the fingers, the said tensioned spring returns them to the first said position with sufficient impact to dislodge any fish caught in the said discharge openings.

3. A dislodging mechanism for a fish separating apparatus of the type having a rotatable cylindrical cage formed of a helically coiled element presenting discharge openings between the convolutions thereof, said mechanism comprising a supporting member having a plurality of fingers spaced to correspond to the pitch of said convolutions and pivotally mounted for turning between a position disposing its said fingers through the said discharge openings into the interior of the cage and a position withdrawing the fingers therefrom, spring means urging the base member to its first said position, a plurality of bars longitudinally secured to the cage at spaced points thereabouts and adapted to contact and outwardly turn the said fingers to the second said position, said outward turning of the fingers tensioning the said springs means whereby, when the said cage bar leaves the distal end of the fingers, the said tensioned spring returns them to the first said position with sufficient impact to dislodge any fish caught in the said discharge openings, and the said supporting member being axially movable for a limited extent and having a spring urging it to one end thereof, the said helically coiled element advancing the fingers and their supporting member axially against its said spring whereby, when the fingers are turned by the bar to their second said position, the supporting member is returned axially by its said spring to its said end position for enterng the said convoluted discharge openings at another angular position of the cage.

4. A dislodging mechanism for a fish separating apparatus of the type having a rotatable cylindrical cage formed of a helically coiled element presenting discharge openings between the convolutions thereof, said mechanism comprising a supporting member having a plurality of fingers spaced to correspond to the pitch of said convolutions and pivotally mounted for turning between a position disposing its said fingers through the said discharge openings into the interior of the cage and a position withdrawing the fingers therefrom, spring means urging the supporting member to its first said position, a plurality of bars longitudinally secured to the cage and adapted to contact and outwardly turn the said fingers to the second said position, said outward turning of the fingers tensioning the said springs means whereby, when the said cage bar leaves the distal end of the fingers, the said tensioned spring returns them to the first said position with sufficient impact to dislodge any fish caught in the said discharge openings and means for axially positioning the supporting member for entering the fingers thereof into the said convoluted discharge openings at another angular position of the cage.

HERBERT P. SMITH.

REFERENCES CITED

The following references are of record in the file of this patent:

UNITED STATES PATENTS

| Number | Name | Date |
|---|---|---|
| 780,581 | Rich | Jan. 24, 1905 |
| 909,358 | Asplund | Jan. 12, 1909 |
| 1,213,239 | Noll | Jan. 23, 1917 |
| 1,899,737 | Ulrich | Feb. 28, 1933 |
| 2,335,891 | Urschel et al. | Dec. 7, 1943 |
| 2,356,945 | Pesznecker | Aug. 29, 1944 |

FOREIGN PATENTS

| Number | Country | Date |
|---|---|---|
| 2,730 | Great Britain | Aug. 7, 1874 |
| 19,684 | Germany | Oct. 13, 1882 |